United States Patent
Ikai et al.

(10) Patent No.: US 9,195,227 B2
(45) Date of Patent: Nov. 24, 2015

(54) MOTOR CONTROL DEVICE FOR COMPENSATING BACKLASH

(71) Applicant: FANUC CORPORATION, Yamanashi (JP)

(72) Inventors: Satoshi Ikai, Yamanashi (JP); Tsutomu Nakamura, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 135 days.

(21) Appl. No.: 14/151,233

(22) Filed: Jan. 9, 2014

(65) Prior Publication Data

US 2014/0197773 A1    Jul. 17, 2014

(30) Foreign Application Priority Data

Jan. 11, 2013  (JP) ................................. 2013-003972

(51) Int. Cl.
*G05B 19/23*    (2006.01)
*G05B 19/404*   (2006.01)

(52) U.S. Cl.
CPC .... *G05B 19/404* (2013.01); *G05B 2219/41078* (2013.01)

(58) Field of Classification Search
CPC ................. B23Q 1/621; G05B 19/231; G05B 2219/41337
USPC ............... 318/630, 560, 631; 74/409, 424.71, 74/440; 700/245, 250, 257, 260; 483/30; 409/146; 901/9
See application file for complete search history.

(56) References Cited

U.S. PATENT DOCUMENTS

| | | | | | |
|---|---|---|---|---|---|
| 4,338,659 | A | * | 7/1982 | Kurakake ...................... | 700/193 |
| 4,800,325 | A | * | 1/1989 | Nakanishi ..................... | 318/661 |
| 5,059,881 | A | * | 10/1991 | Fujita et al. .................... | 318/630 |
| 5,153,490 | A | * | 10/1992 | Ueta et al. ..................... | 318/571 |
| 5,210,478 | A | * | 5/1993 | Sasaki et al. .................. | 318/632 |
| 5,237,509 | A | * | 8/1993 | Ueta et al. ..................... | 700/193 |

(Continued)

FOREIGN PATENT DOCUMENTS

| JP | 09319418 A | 12/1997 |
|---|---|---|
| JP | 2000250614 A | 9/2000 |

(Continued)

OTHER PUBLICATIONS

English Abstract of Japanese Publication No. 2002-297241, Published Oct. 11, 2002, 1 page.

(Continued)

*Primary Examiner* — Rita Leykin
(74) *Attorney, Agent, or Firm* — Fredrikson & Byron, P.A.

(57) ABSTRACT

A motor control device includes a position command generating unit, a difference calculating unit for calculating a difference between a positional detection value of a movable unit and a positional detection value of a driven unit, a retaining unit for retaining, as an engaging difference, the difference when the movable unit is moved in a first or second direction to engage with the driven unit, in association with the first direction and the second direction, and a compensation amount calculating unit for calculating a backlash compensation amount based on the difference calculated by the difference calculating unit and the engaging difference retained by the retaining unit. It is determined whether or not the movable unit is engaged with the driven unit by comparing a movement amount of the driven unit with a threshold.

5 Claims, 8 Drawing Sheets

(56) References Cited

U.S. PATENT DOCUMENTS

| | | | |
|---|---|---|---|
| 5,313,114 A * | 5/1994 | Poletto et al. | 327/65 |
| 6,889,115 B2 * | 5/2005 | Shiba et al. | 700/186 |
| 6,907,168 B2 * | 6/2005 | Tang | 385/39 |
| 8,508,171 B2 * | 8/2013 | Miyaji | 318/560 |

FOREIGN PATENT DOCUMENTS

| | | |
|---|---|---|
| JP | 2001222324 | 8/2001 |
| JP | 2002297241 | 10/2002 |
| JP | 3687958 B2 | 8/2005 |
| JP | 2007213443 | 8/2007 |
| JP | 2012171069 | 9/2012 |
| JP | 2014054001 | 3/2014 |

OTHER PUBLICATIONS

English Abstract of Japanese Publication No. 2007-213443, Published Aug. 23, 2007, 1 page.

English Abstract of Japanese Publication No. 2012-171069, Published Sep. 10, 2012, 1 page.

English Abstract of Japanese Publication No. 2001-222324, Published Aug. 17, 2001, 1 page.

English Abstract of Japanese Publication No. 2014-054001, Published Mar. 20, 2014, 1 page.

* cited by examiner

MOTOR CONTROL DEVICE FOR COMPENSATING BACKLASH

TECHNICAL BACKGROUND

1. Field of the Invention

The present invention relates to a motor control device for compensating for backlash.

2. Description of the Related Art

A servomotor is connected to a feed axis of an industrial machine, such as a machine tool, or to an axis of an industrial robotic arm (mechanical movable unit). Rotary motion of the servomotor may be converted into linear motion of a table via a ball screw, or transmitted to the axis at a reduced rotational velocity via a speed reducer.

In the ball screw or the speed reducer, a mechanical element on the servomotor side such as a screw or gear and a corresponding mechanical element on the driven unit side which is driven by the servomotor are brought into engagement to transmit power therebetween. In some cases, a difference may exist between an engagement position where the mechanical elements engage with each other when the servomotor rotates in a positive direction and an engagement position where the mechanical elements engage with each other when the servomotor rotates in a negative direction. Such a difference is generally referred to as "backlash," and could cause accuracy in positioning the driven unit by the servomotor to be impaired.

FIGS. 7A to 7C are drawings to explain backlash. FIGS. 7A to 7C illustrate a movable unit WA driven by a motor (not shown) and a driven unit WB driven by the movable unit WA. The movable unit WA is provided with protruding portions A1 and A2 at both ends thereof. The driven unit WB is provided with a protruding portion B at its center. When the movable unit WA moves rightward, an inner end of the protruding portion A1 of the movable unit WA on the left side engages with the protruding portion B of the driven unit WB (FIG. 7A). In this state, the movable unit WA and the driven unit WB together move to the right-hand side.

In order to change a movement direction of the driven unit WB from the rightward to the leftward, the movable unit WA is moved to the left-hand side (FIG. 7B). Then, when an inner end of the protruding portion A2 of the movable unit WA on the right side engages with the protruding portion B of the driven unit WB (FIG. 7C), the movable unit WA and the driven unit WB together move to the left-hand side.

As described above, in order to reverse a movement direction of the driven unit WB, the movable unit WA has to move by a predetermined movement amount C (see FIGS. 7A and 7C) corresponding to the backlash before the movable unit WA engages again with the driven unit WB after the engagement between the movable unit WA and the driven unit WB is released. The additional movement amount C necessary due to the backlash may result in reduced accuracy in positioning.

In order to prevent this, it has been known to generate a compensation amount for compensating backlash, which is to be added to a position command to a motor at the time of reversing in motion. JP-A-9-319418 discloses a related art in which a relationship between a feeding speed of the respective axes prior to a reverse in motion and a compensation amount corresponding to a movement amount before the motion is reversed is measured in advance to calculate a necessary compensate amount. JP-A-2000-250614 discloses a related art in which a compensation amount is adjusted, depending on time elapsed after the reverse in motion.

FIG. 8 is another drawing to explain backlash. FIG. 8 illustrates a state where neither the protruding portion A1 nor the protruding portion A2 of the movable unit WA engages with the protruding portion B. When the movable unit WA is then moved leftward, the movable unit WA moves over a distance C1 shorter than the distance C corresponding to the backlash to engage with the driven unit WB (also see FIG. 7C). This tends to occur when backlash is relatively large.

In such a case, if a constant compensation amount corresponding to the backlash is simply added to a position command to a motor, the resultant compensation for the backlash may become excessively large. Alternatively, in order to prevent a compensation amount from becoming excessively large, a compensation amount may also be set so as to be smaller than the backlash. However, in this case, there is a risk that a compensation amount may turn out to be too small to provide sufficient compensation to the backlash at the time of the reverse motion.

In this connection, Japanese Patent Application No. 2012-195098, which is an unpublished co-pending application filed by the applicant of the present application, relates to a motor control device for allowing an appropriate compensation amount to backlash to be obtained, irrespective of a positional relationship between a movable unit and a driven unit.

However, according to the related art proposed in Japanese Patent Application No. 2012-195098, it may be necessary to store a positional relationship between the movable unit and the driven unit when they are in engagement with each other. Such information can be stored by software; however, the stored information will be lost when electric power to the control device is shut off. The necessary information may be stored in a non-volatile memory, but this leads to an increase in cost. In addition, since the mechanical configuration and the mechanical property may be subject to change, it is preferable to obtain information necessary for backlash compensation at the time of activation of the control device.

Accordingly, there is a need for a motor control device for allowing optimal backlash compensation to be carried out even immediately after activation of the device.

SUMMARY OF THE INVENTION

According to a first aspect of the present application, a motor control device for compensating backlash between a movable unit driven by a motor and a driven unit driven by the movable unit, the motor control device comprising: a position command generating unit for generating a position command for the driven unit; a first position detecting unit for detecting a position of the movable unit; a second position detecting unit for detecting a position of the driven unit; a difference calculating unit for calculating a difference between a first positional detection value detected by the first position detecting unit and a second positional detection value detected by the second position detecting unit; a judging unit for judging whether or not the movable unit is engaged with the driven unit when the movable unit is driven in a first direction and in a second direction opposite to the first direction; a retaining unit for retaining the difference calculated by the difference calculating unit as an engaging difference, in association with the first direction or the second direction, when the judging unit determines that the movable unit is engaged with the driven unit; and a compensation amount calculating unit for calculating a backlash compensation amount, based on the difference calculated by the difference calculating unit, and the engaging difference retained by the retaining unit, wherein the judging unit is adapted to determine that the movable unit is engaged with the driven unit when a movement amount of the driven unit exceeds a threshold, is provided.

According to a second aspect of the present application, in the motor control device according to the first aspect, the position command generating unit is adapted to generate a position command for a preliminary movement of the driven unit when the judging unit judges whether or not the movable unit is engaged with the driven unit.

According to a third aspect of the present application, in the motor control device according to the second aspect, the position command for a preliminary movement of the driven unit is set so as to be smaller than a unit of the position command for the driven unit.

According to a fourth aspect of the present application, in the motor control device according to the third aspect, the position command for a preliminary movement of the driven unit is set to be half a unit of the position command for the driven unit.

According to a fifth aspect of the present application, in the motor control device according any of the second to fourth aspects, the position command generating unit is adapted to generate the position command for a preliminary movement of the driven unit, when at least one of the engaging difference in the first direction and the engaging difference in the second direction is not retained by the retaining unit.

These and other objects, features and advantages of the present invention will become more apparent in light of the detailed description of exemplary embodiments thereof as illustrated by the drawings.

DETAILED DESCRIPTION OF THE INVENTION

Embodiments of the present invention will be described with reference to the accompanying drawings. The illustrated constituent elements may be modified in size in relation to one another as necessary for better understanding of the present invention. The same or corresponding constituent elements are designated with the same referential numerals.

Figure 1:
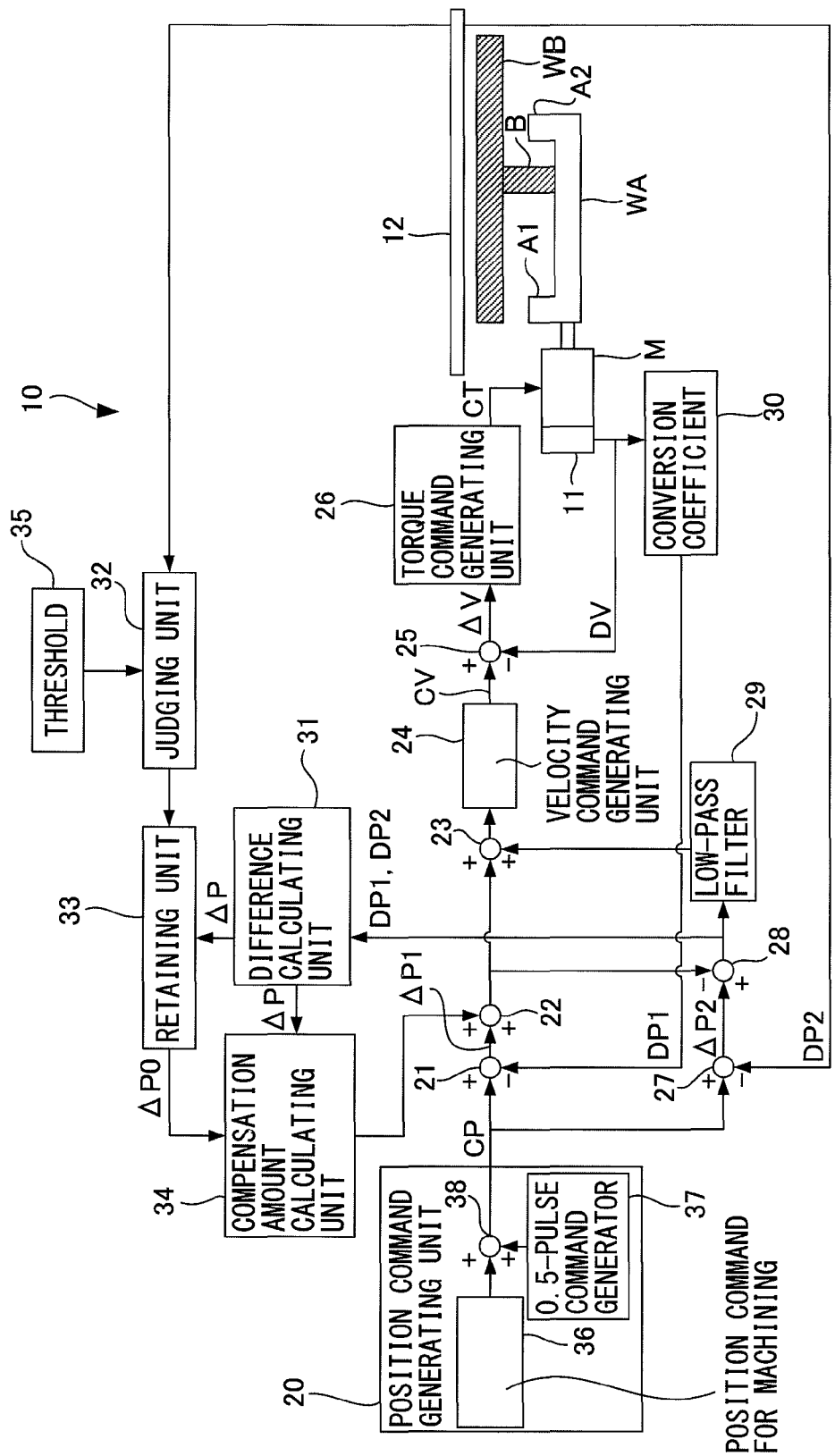
FIG. 1 is a functional block diagram of a motor control device according to a first embodiment of the present invention.

FIG. 1 is a functional block diagram of a motor control device 10 according to a first embodiment of the present invention. As shown in FIG. 1, a movable unit WA provided with a pair of protruding portions A1 and A2 is connected to an output axis of a motor M with a screwed portion. A driven unit WB provided with a protruding portion B is arranged such that the driven unit WB may engage with the movable unit WA.

Figure 7A:
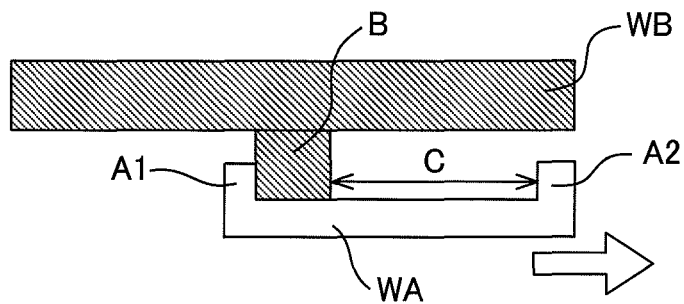
FIG. 7A illustrates backlash.
Figure 7B:
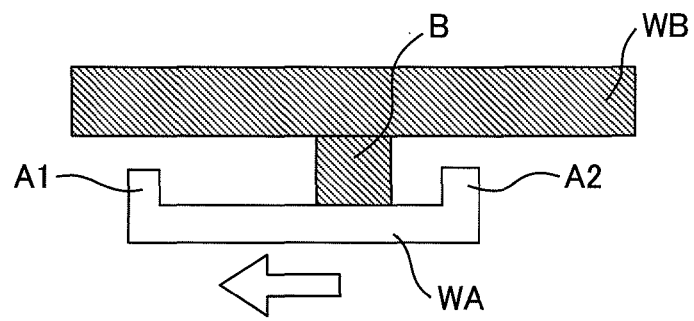
FIG. 7B illustrates backlash.
Figure 7C:
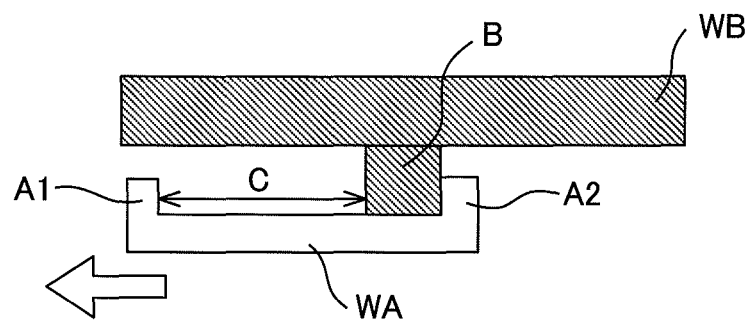
FIG. 7C illustrates backlash.
Figure 8:
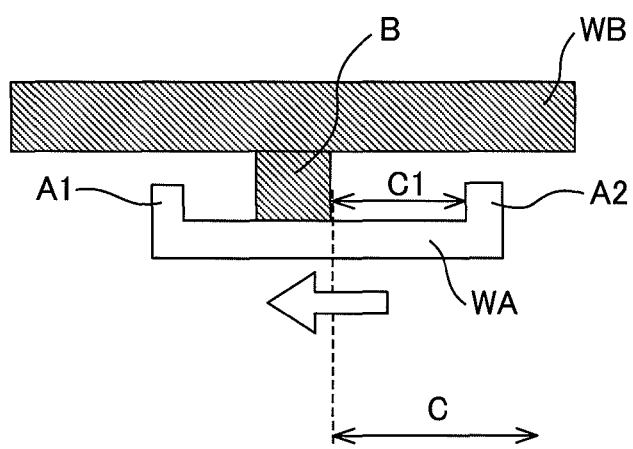
FIG. 8 is another drawing illustrating backlash.

As described above with reference to FIGS. 7A to 7C, there is backlash between the movable unit WA and the driven unit WB. The size of the backlash (movement amount C) is obtained by measuring a movement amount of the movable unit WA by a three-dimensional measuring device, and then comparing the measured movement amount with a movement amount of the motor M to measure the difference therebetween, for example. Alternatively, the backlash may also be obtained by measuring a quadrant projection generated when one quadrant is shifted to another.

As illustrated in FIG. 1, a first position detecting unit 11, such as an encoder, for detecting a position of the movable unit WA is attached to the motor M. The first position detecting unit 11 may also detect a velocity of the movable unit WA in a known manner. Further, a second position detecting unit 12 for detecting a position of the driven unit WB is arranged adjacent to the driven unit WB.

The motor control device 10 includes a position command generating unit 20 for periodically generating a position command value CP for the movable unit WA, a velocity command generating unit 24 for generating a velocity command CV for the movable unit WA, and a torque command generating unit 26 for generating a torque command CT for the motor M.

The motor control device 10 also includes a difference calculating unit 31 for calculating a difference ΔP between a first positional detection value DP1 detected by the first position detecting unit 11 and a second positional detection value DP2 detected by the second position detecting unit 12. The motor control device 10 also includes a judging unit 32 for judging whether or not the movable unit WA has engaged with the driven unit WB when the movable unit WA in a given initial position is moved in a first direction and in a second direction opposite to the first direction.

The motor control device 10 further includes a retaining unit 33 for retaining a difference ΔP calculated by the difference calculating unit 31 as an engaging difference ΔP0 in association with the first direction and the second direction, when the judging unit 32 determines that the movable unit WA has engaged with the driven unit WB. The retaining unit 33 is adapted to retain other elements such as a velocity. Further, the motor control device 10 includes a compensation amount calculating unit 34 for calculating a backlash compensation amount for eliminating an influence by the backlash.

Figure 2:
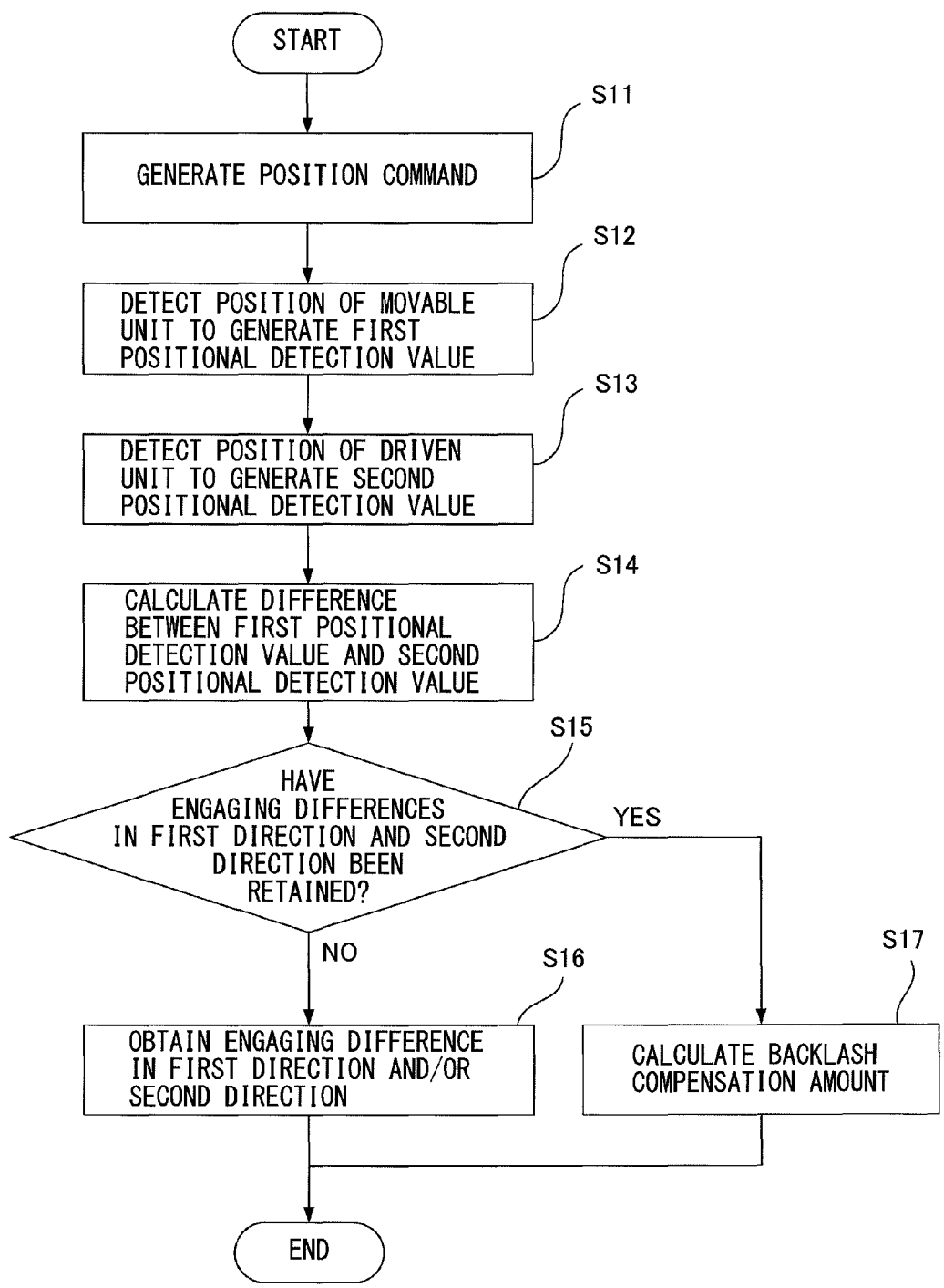
FIG. 2 is a flowchart showing a process for calculating a backlash compensation amount in the motor control device according to the first embodiment of the present invention.

FIG. 2 is a flowchart showing a process for calculating a backlash compensation amount in the motor control device 10 according to one embodiment of the present invention. The process shown in FIG. 2 is repeated in a predetermined control cycle. An operation of the motor control device 10 of the present invention will be described below with reference to FIGS. 1 and 2.

First, at Step S11 of FIG. 2, the position command generating unit 20 of the motor control device 10 generates a position command value CP based on a machining program. As shown in FIG. 1, the position command value CP output from the position command generating unit 20 may contain a position command for machining 36 as well as an output value of a 0.5-pulse command generator 37. However, the position command for machining 36 is generated at Step S11.

The position command for machining 36 is a position command for moving the driven unit WB to a predetermined position. Although the term "for machining" is used herein for convenience so as to differentiate it from a position command for a preliminary movement, which will be described below, use of the term is not intended to limit a subject to which the present invention can be applied. At Steps S12 and S13, the first position detecting unit 11 and the second position detecting unit 12 detect a position of the movable unit WA and a position of the driven unit WB to generate a first positional detection value DP1 and a second positional detection value DP2, respectively.

As illustrated in FIG. 1, the first positional detection value DP1 detected by the first position detecting unit 11 is subtracted by a subtractor 21 from the position command value CP generated by the position command generating unit 20 to generate a first positional difference $\Delta P1$. As can be seen in FIG. 1, the first positional detection value DP1 is a value obtained by multiplying a detection value of the first position detecting unit 11 by a conversion coefficient 30.

The second positional detection value DP2 detected by the second position detecting unit 12 is subtracted from the position command value CP by a subtractor 27 to generate a second positional difference $\Delta P2$. Further, the first positional difference $\Delta P1$ is subtracted by a subtractor 28 from the second positional difference $\Delta P2$, and the resultant value is output to an adder 23 via a low-pass filter 29. The low-pass filter 29 is provided between the subtractor 28 and the adder 23, and therefore, a position is controlled based on a positional detection value from the first position detecting unit 11 when a change in a positional difference is large, in order to stabilize movement of the movable unit WA, and on the other hand, when a change in a positional difference is small, a position is controlled based on a positional detection value from the second position detecting unit 12, in order to increase accuracy in positioning the driven unit WB.

The first positional difference $\Delta P1$ and the second positional difference $\Delta P2$ added by the adder 23 are input to the velocity command generating unit 24 to generate a velocity command value CV. Further, a velocity detection value DV detected by the first position detecting unit 11 is subtracted from the velocity command value CV by a subtractor 25 to calculate a velocity difference $\Delta V$. Next, the torque command generating unit 26 generates a torque command value CT based on the velocity difference $\Delta V$. The torque command value CT is input to the motor M. The generated velocity command value CV and velocity detection value DV are successively retained by the retaining unit 33.

As can be seen in FIG. 1, according to the present invention, a value obtained at the subtractor 28 by subtracting the first positional difference $\Delta P1$ from the second positional difference $\Delta P2$ is input to the difference calculating unit 31. Since the first positional difference $\Delta P1$ and the second positional difference $\Delta P2$ both include the position command value CP, the position command value CP is substantially removed from the input value to the difference calculating unit 31, as a result of the subtraction at the subtractor 28. Accordingly, the difference calculating unit 31 may easily calculate the difference $\Delta P$ between the first positional detection value DP1 and the second positional detection value DP2 (Step S14). Alternatively, as described below, the first positional difference $\Delta P1$ and the second positional difference $\Delta P2$ may also be directly input to the difference calculating unit 31 to calculate a difference $\Delta P$.

Then, at Step S15, it is determined whether or not the retaining unit 33 retains an engaging difference $\Delta P0$ in a state where the movable unit WA engages with the driven unit WB in the first direction, and an engaging difference $\Delta P0$ in a state where the movable unit WA engages with the driven unit WB in the second direction. When it is determined at Step S15 that at least one of the engaging differences $\Delta P0$ in the first direction and the second direction is not retained, the process proceeds to Step S16 in which a process for obtaining an engaging difference $\Delta P0$ is performed. This process will be described below in detail. On the other hand, when it is determined at Step S15 that engaging differences $\Delta P0$ in the first and second directions are retained, the process proceeds to Step S17. At Step S17, a backlash compensation amount is calculated based on the difference $\Delta P$ calculated by the difference calculating unit 31, and the engaging differences $\Delta P0$ retained by the retaining unit 33.

Figure 3:
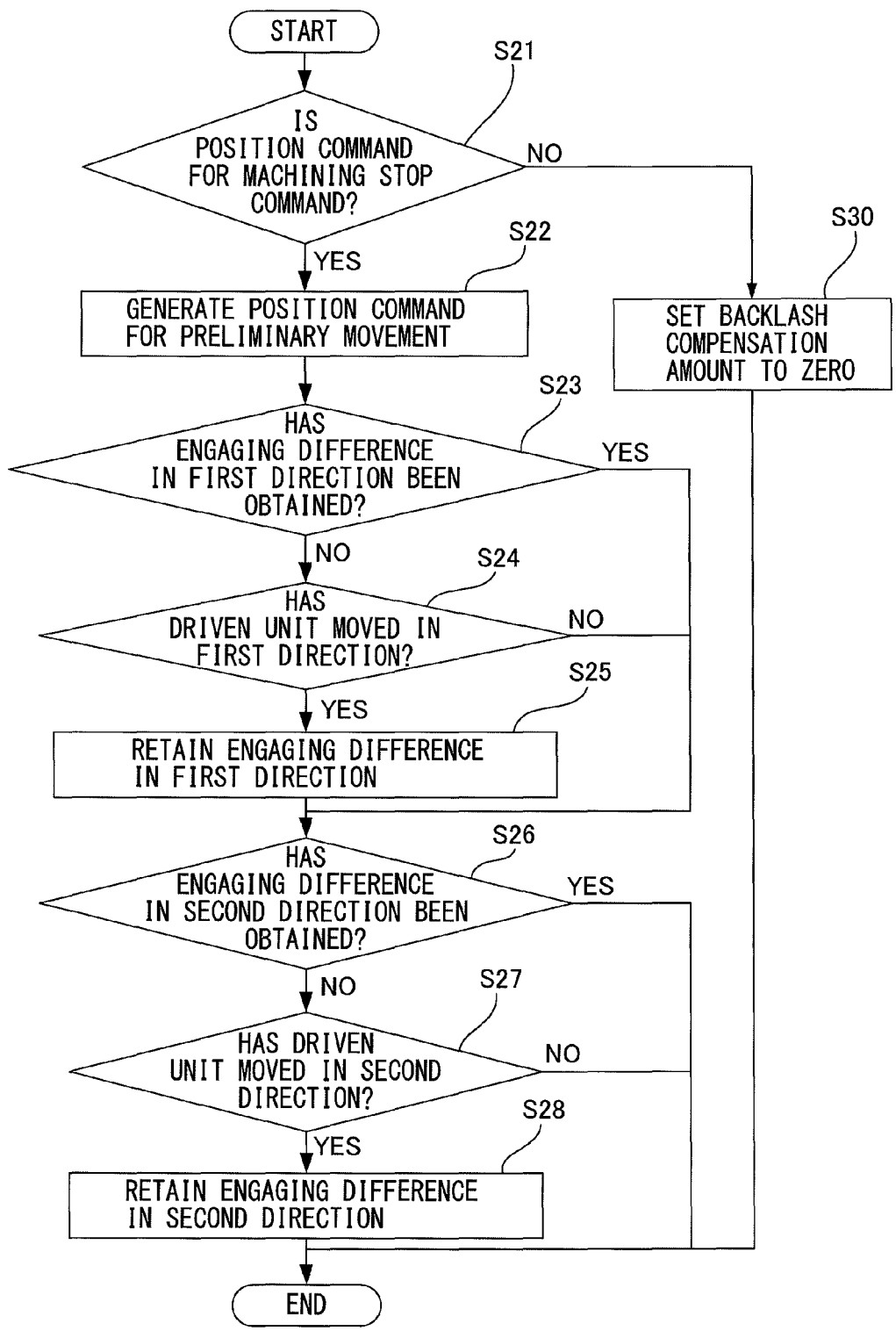
FIG. 3 is a flowchart showing a process for calculating an engaging difference in the respective driving directions when a movable unit and a driven unit engage with each other, in a motor control device according to one embodiment of the present invention.

With reference to FIG. 3, the process for calculating an engaging difference $\Delta P0$ at Step S16 in FIG. 2 is described. FIG. 3 is a flowchart showing a process for calculating engaging differences $\Delta P0$ in the first direction and the second direction in a state where the movable unit WA and the driven unit WB engage with each other. This calculation process is performed in the motor control device 10 according to one embodiment of the present invention.

As shown in FIG. 3, first, at Step S21, it is determined whether or not a position command for machining 36 from the position command generating unit 20 is a stop command for stopping the driven unit WB. When it is determined at Step S21 that the position command for machining 36 is not a stop command for stopping the driven unit WB, the process proceeds to Step S30. This means that an operator intends to operate the driven unit WB for a certain reason, even though an engaging difference $\Delta P0$ is not retained as determined at Step S15 in FIG. 2. In this case, a backlash compensation amount has yet to be obtained. Accordingly, the process is terminated without performing backlash compensation. As a result, the compensation amount calculating unit 34 sets a backlash compensation value to zero (Step S30).

On the other hand, when it is determined at Step S21 that the position command for machining 36 is a stop command for stopping the driven unit WB, the process proceeds to Step S22 where a position command for a preliminary movement of the driven unit WB is generated. The position command for the preliminary movement is output from the 0.5-pulse command generator 37 to the adder 38 and then output from the position command generating unit 20 as a position command CP. According to the present embodiment, the 0.5-pulse command generator 37 outputs a position command corresponding to a pulse of 0.5 times of a unit width of a position command CP (hereinafter referred to as "0.5 pulse").

Figure 4:
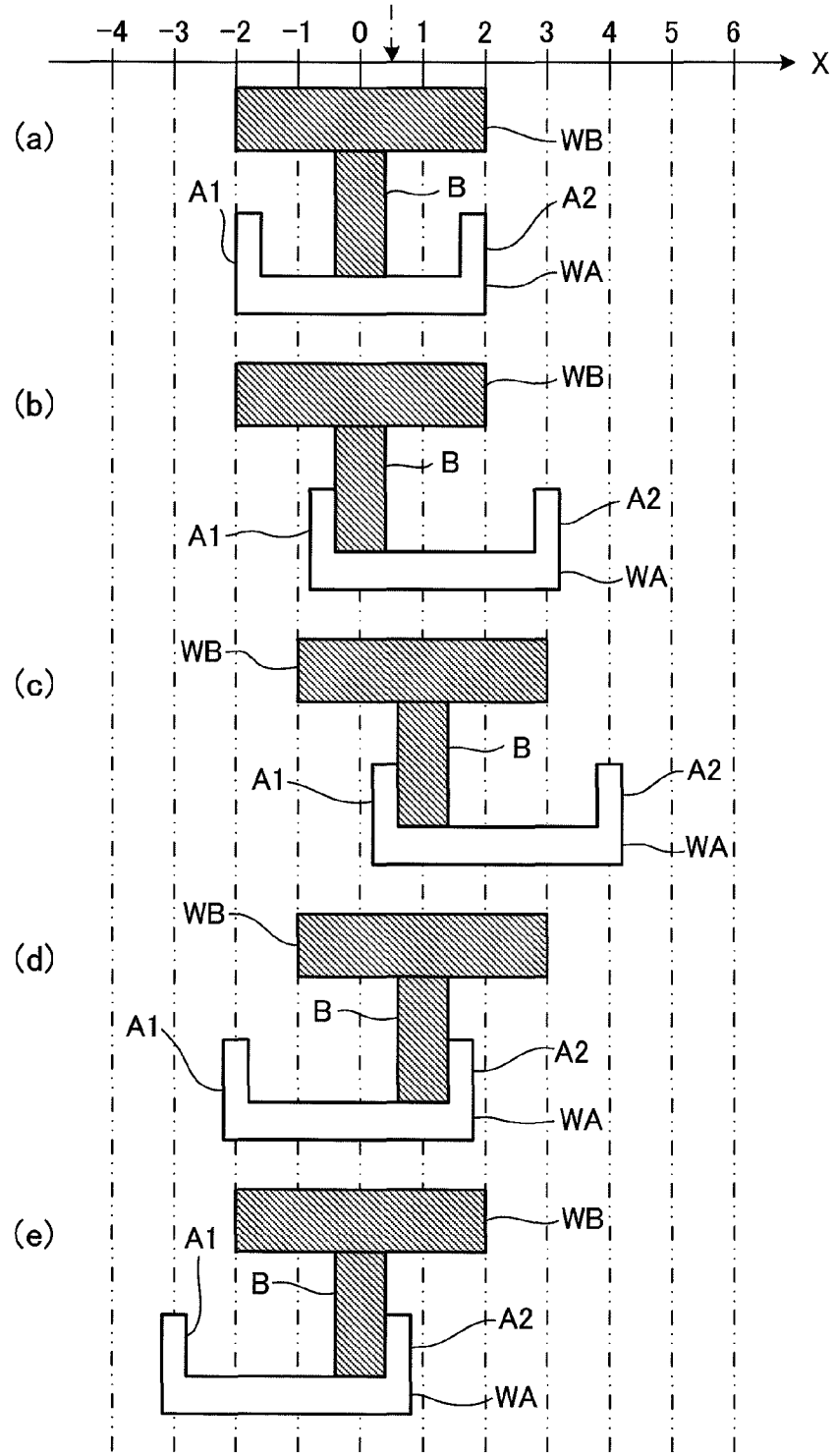
FIG. 4 illustrates preliminary movement of the driven unit for obtaining a difference when the movable unit and the driven unit engage with each other, in a motor control device according to one embodiment of the present invention.

FIG. 4 is a drawing to explain the preliminary movement of the driven unit WB for obtaining an engaging difference $\Delta P0$ in a state where the movable unit WA and the driven unit WB engage with each other, in the motor control device 10 according to the present embodiment. At the time of the preliminary movement, the driven unit WB is preferably moved only by a movement amount that is remarkably smaller than a movement amount at the time of a regular operation control, such as machining. An exemplary case where a pulse of 0.5 times of a unit width of a position command CP as described above is generated will be considered herein.

Part (a) of FIG. 4 illustrates an initial positional relationship between the movable unit WA and the driven unit WB. At this time, the driven unit WB is positioned at the x-coordinate of zero. In this state, a position command of a 0.5 pulse is generated (i.e., a position command for moving the driven unit WB to the X-coordinate of 0.5 is generated). In response to the position command of a 0.5 pulse, the movable unit WA moves rightward in FIG. 4 (or in a first direction), and thus the protruding portion A1 of the movable unit WA engages with the protruding portion B of the driven unit WB (part (b) of FIG. 4). Then, the movable unit WA and the driven unit WB together move in the first direction until the driven unit WB reaches a position corresponding to the x-coordinate of 1.

The state where the driven unit WB is positioned at the x-coordinate of 1 (part (c) of FIG. 4) indicates that the driven unit WB is moved in the first direction beyond the command position (X=0.5). Accordingly, the motor M operates in reverse movement so as to move the driven unit WB in a second direction opposite to the first direction. Thus, the driven unit WB is moved in the second direction to bring the protruding portion A2 of the movable unit WA and the protruding portion B of the driven unit WB into engagement with each other (part (d) of FIG. 4). Then, the movable unit WA and the driven unit WB together move in the second direction until the driven unit WB reaches the x-coordinate of zero. With the 0.5 pulse for a preliminary movement of the driven unit WB, the driven unit WB is moved in the first direction, and then reversely moved in the second direction. In this way, the movable unit WA and the driven unit WB are brought into engagement with each other in the opposite driving directions, i.e., the first and second directions. In addition, with the pulse of 0.5 times of a unit width of the position command, a moving speed of the driven unit WB in the first direction is equal to a moving speed in the second direction, and therefore, the preliminary movement can be advantageously carried out for a short period of time.

Referring again to FIG. 3, it is determined at Step S23 whether or not an engaging difference ΔP0 in the first direction has been obtained. When it is determined at Step S23 that the engaging difference ΔP0 in the first direction has not been obtained, the process proceeds to Step S24 where it is determined whether or not the driven unit WB has been moved in the first direction. This judgment is performed by the judging unit 32 (FIG. 1) in order to determine whether or not the movable unit WA has engaged with the driven unit WB. The judging unit 32 compares a movement amount of the driven unit WB in the preliminary movement obtained based on a positional detection value DP2 from the position detecting unit 12 with a threshold 35 (see FIG. 1). When the movement amount of the driven unit WB exceeds the threshold 35, the judging unit 32 determines that the movable unit WA has engaged with the driven unit WB. In the example shown in FIG. 4, a movement amount (+1) of the driven unit WB from the state of part (b) to the state of part (c) is compared with the threshold 35. The threshold 35 may be a given value between 0 and +1. The threshold 35 is set so as to eliminate a judgment error due to a noise or a disturbance.

When it is determined at Step S24 that the driven unit has been moved in the first direction, the process proceeds to Step S25 where a difference between a positional detection value DP1 of the movable unit WA and a positional detection value DP2 of the driven unit WB at that time is retained by the retaining unit 33 as an engaging difference ΔP0 in the first direction.

When it is determined at Step S23 that an engaging difference ΔP0 in the first direction has been obtained, or it is determined at Step S24 that the driven unit WB has not been moved in the first direction, the process proceeds to Step S26.

At Steps S26 to S28, the same processes as those at Steps S23 to S25 are performed with respect to the second direction. Specifically, when it is determined at Step S27 whether or not the driven unit WB has been moved in the second direction, a movement amount (−1) of the driven unit WB from the state of part (d) to the state of part (e) of FIG. 4 is compared with a threshold 35. The threshold 35 is set between −1 and 0, with consideration of a noise or a disturbance. In the above-described manner, the engaging differences ΔP0 in the first and second directions are retained by the engaging difference retaining unit 33.

As described above, according to the illustrated embodiment, a pulse of 0.5 times of a unit width of a position command for machining is used as a position command for preliminary movement of the driven unit WB. However, the present invention is not limited to such a specific example. For example, any other position command smaller than a unit width of a position command for machining may also be used, instead of the 0.5 pulse. Alternatively, a position command equal to or larger than a unit width of a position command for machining may also be used for the preliminary movement of the driven unit WB. For example, when a command of twice of a unit width of a position command for machining is applied (when a commanded position is the x-coordinate of 2), a reverse command for returning the driven unit WB to the x-coordinate of zero is applied after the driven unit WB once reaches the x-coordinate of 2.

Figure 5A:
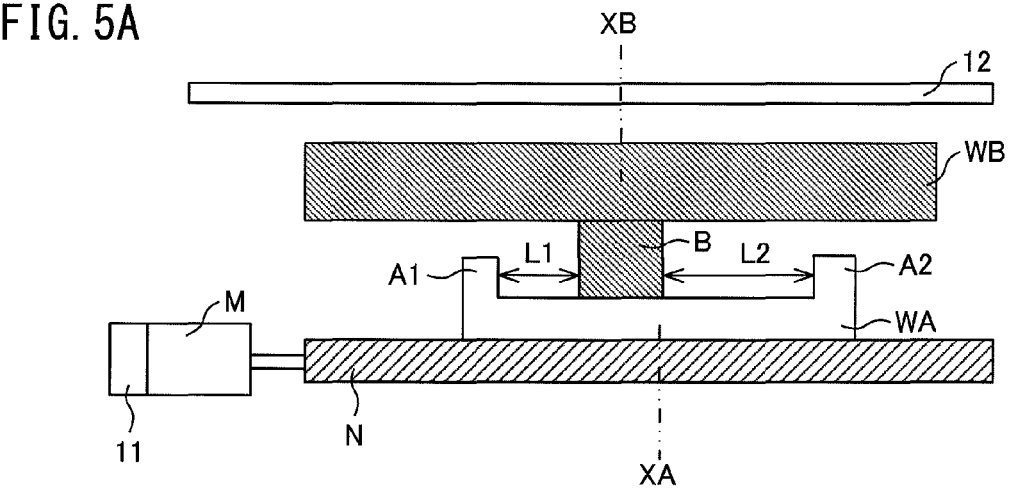
FIG. 5A illustrates movement of a movable unit and a driven unit.
Figure 5B:
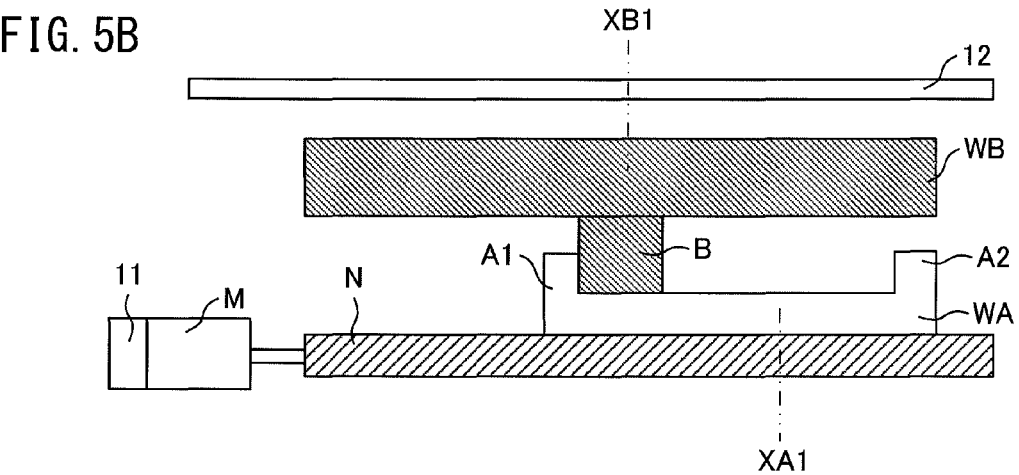
FIG. 5B illustrates movement of the movable unit and the driven unit.
Figure 5C:
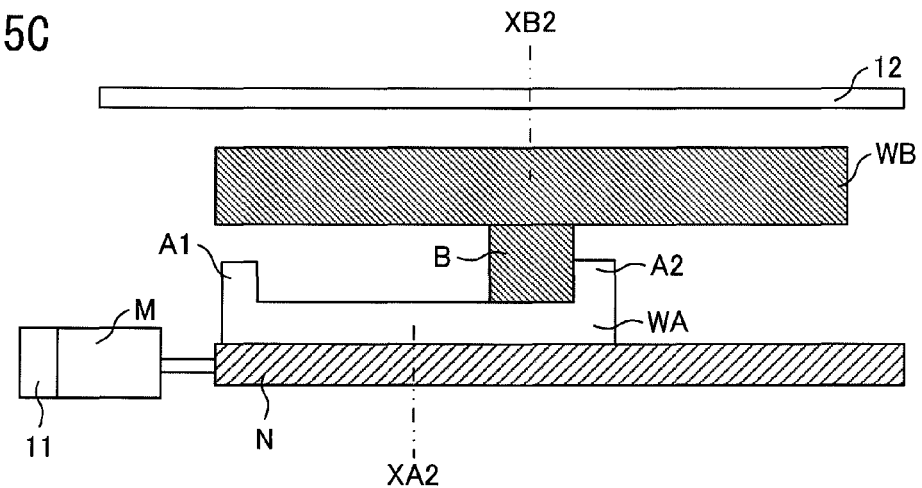
FIG. 5C illustrates movement of the movable unit and the driven unit.

A process for calculating a backlash compensation amount at Step S17 in FIG. 2 is described with reference to FIGS. 5A to 5C which illustrate movement of the movable unit WA and the driven unit WB. FIGS. 5A to 5C illustrate the case where power is transmitted from a motor M to the movable unit WA by way of a ball screw. For example, if the movable unit WA is a ball screw with a screw axis N, the protruding portions A1 and A2 correspond to threads, and the protruding portion B of the driven unit WB corresponds to a nut which engages with the screw axis N.

FIG. 5A illustrates an exemplary initial positional relationship between the movable unit WA and the driven unit WB. In FIG. 5A, the protruding portion B of the driven unit WB is situated between the protruding portions A1 and A2 of the movable unit WA. Although gaps L1 and L2 between the protruding B and the protruding portions A1 and A2 are defined in the drawing, respectively, the actual sizes of these gaps L1 and L2 are unknown. In the following description, the right-hand direction and the left-hand direction in FIGS. 5A to 5C will be referred to as a first direction and a second direction, respectively. In the states illustrated in FIGS. 5A to 5C, positional detection values of the movable unit WA are detected by the first position detecting unit 11 as XA, XA1 and XA2, respectively. Positional detection values of the driven unit WB are detected by the second position detecting unit 12 as XB, XB1 and XB2, respectively.

FIG. 5B illustrates the state where the protruding portion A1 of the movable unit WA and the protruding portion B of the driven unit WB engage with each other. FIG. 5C illustrates the state where the protruding portion A2 of the movable unit WA and the protruding portion B of the driven unit WB engage with each other. As apparent from FIGS. 5A to 5C, the size of backlash when the driven unit WB is driven in the first direction from the state of FIG. 5A is L1, and the size of backlash when the driven unit WB is driven in the second direction from the state of FIG. 5A is L2.

When the driven unit WB is moved from the state of FIG. 5A to the state of FIG. 5B, the movable unit WA is moved over a distance of L1 in the first direction relative to the driven unit WB. Accordingly, the size of L1 corresponding to a backlash compensation amount in the first direction can be obtained by subtracting a difference between the positional detection value XA of the movable unit WA and the positional detection value XB of the driven unit WB in the state of FIG. 5A from a difference between the positional detection value XA1 of the movable unit WA and the positional detection value XB1 of the driven unit WB in the state of FIG. 5B.

In the same way, when the driven unit WB is moved in the second direction, the size of L2 corresponding to a backlash compensation amount in the second direction can be obtained by subtracting a difference between the positional detection value XA of the movable unit WA and the positional detection value XB of the driven unit WB in the state of FIG. 5A from a difference between the positional detection value XA2 of the movable unit WA and the positional detection value XB2 of the driven unit WB in the state of FIG. 5C.

Therefore, according to the present embodiment, a backlash compensation amount is calculated based on a difference ΔP between a current position XA of the movable unit WA and a current position XB of the driven unit WB, and on an engaging difference ΔP0 retained by the retaining unit 33. This allows an optimal backlash compensation amount for a positional relationship between the movable unit WA and the driven unit WB to be obtained. In addition, a backlash compensation amount can be obtained through preliminary movement of the driven unit WB in which the driven unit WB is moved over a minuscule distance. Accordingly, even in a case of executing an initial command immediately after the motor control device 10 is turned on, it is possible to prevent decreased accuracy in positioning due to the backlash.

Figure 6:
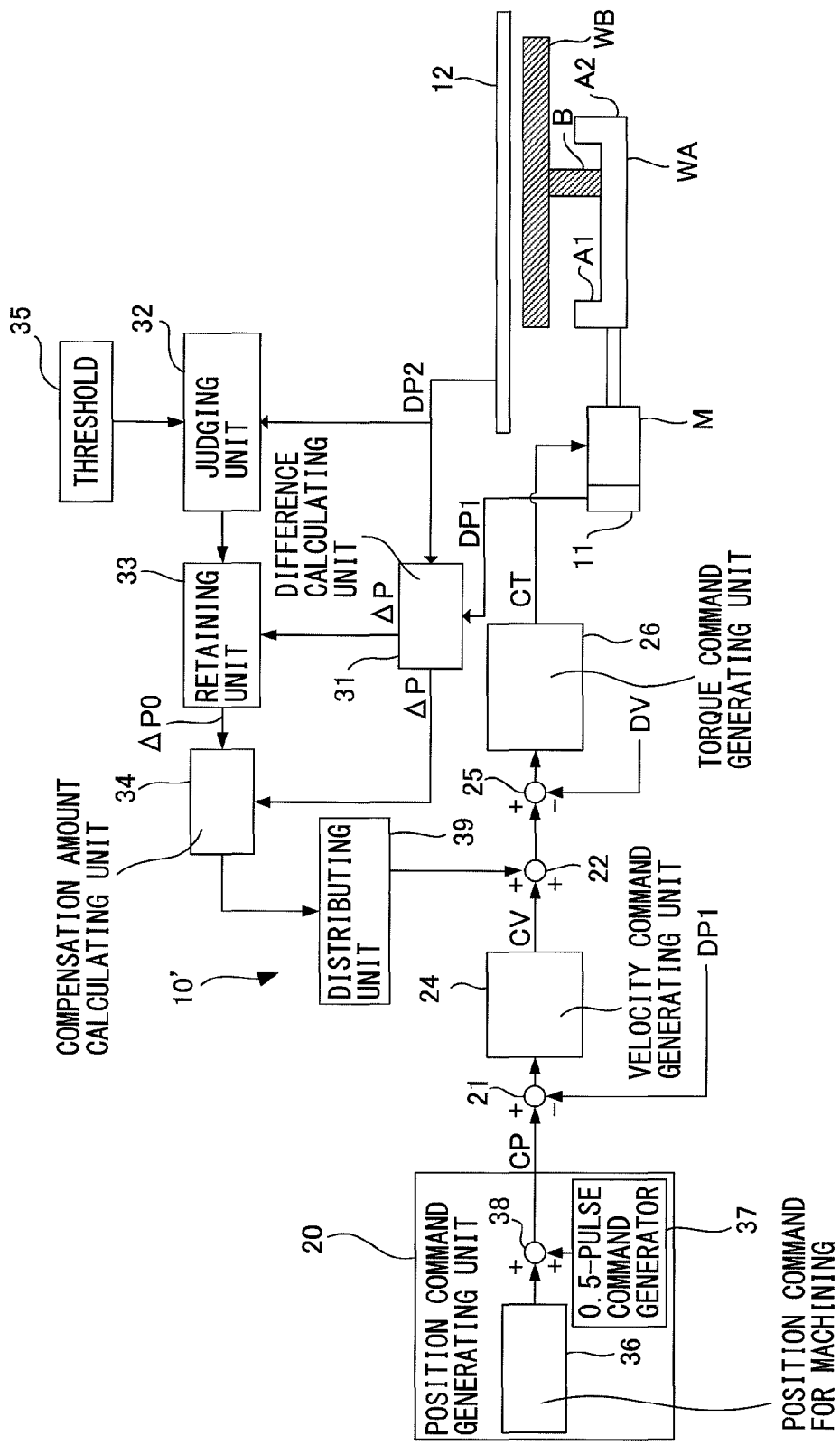
FIG. 6 is a functional block diagram of a motor control device according to a second embodiment of the present invention.

FIG. 6 is a functional block diagram of a motor control device 10' according to a second embodiment of the present invention. In FIG. 6, a first positional detection value DP1 detected by the first position detecting unit 11 and a second positional detection value DP2 detected by the second position detecting unit 12 are input directly to the difference calculating unit 31. A backlash compensation amount which is calculated by the compensation amount calculating unit 34 in the same manner as the above-described first embodiment is input to the adder 22 through a distributing unit 39 and then added to a velocity command value CV. Since the backlash compensation amount output from the compensation amount calculating unit 34 passes through the distributing unit 39, the backlash compensation amount is subjected to time-division before added to the adder 22. It is apparent that the same advantages as those described in relation to the first embodiment can be achieved in the case of the motor control device 10'.

EFFECT OF THE INVENTION

The motor control device according to the present invention judges that the movable unit and the driven unit have engaged with each other when a movement amount of the driven unit exceeds a threshold. Accordingly, an appropriate backlash compensation amount can be obtained even in the case where information regarding a positional relationship between the movable unit and the driven unit when they are in engagement is not stored in advance.

Although the invention has been shown and described with exemplary embodiments thereof, it should be understood by those skilled in the art that the foregoing and various other changes, omissions and additions may be made therein and thereto without departing from the spirit and scope of the invention.

What is claimed is:

1. A motor control device for compensating backlash between a movable unit driven by a motor and a driven unit driven by the movable unit, the motor control device comprising:
   a position command generating unit for generating a position command for the driven unit;
   a first position detecting unit for detecting a position of the movable unit;
   a second position detecting unit for detecting a position of the driven unit;
   a difference calculating unit for calculating a difference between a first positional detection value detected by the first position detecting unit and a second positional detection value detected by the second position detecting unit;
   a judging unit for judging whether or not the movable unit is engaged with the driven unit when the movable unit is driven in a first direction and in a second direction opposite to the first direction;
   a retaining unit for retaining the difference calculated by the difference calculating unit as an engaging difference, in association with the first direction or the second direction, when the judging unit determines that the movable unit is engaged with the driven unit; and
   a compensation amount calculating unit for calculating a backlash compensation amount, based on the difference calculated by the difference calculating unit, and the engaging difference retained by the retaining unit,
   wherein the judging unit is adapted to determine that the movable unit is engaged with the driven unit when a movement amount of the driven unit exceeds a threshold.

2. The motor control device according to claim 1, wherein the position command generating unit is adapted to generate a position command for a preliminary movement of the driven unit when the judging unit judges whether or not the movable unit is engaged with the driven unit.

3. The motor control device according to claim 2, wherein the position command for a preliminary movement of the driven unit is set so as to be smaller than a unit of the position command for the driven unit.

4. The motor control device according to claim 3, wherein the position command for a preliminary movement of the driven unit is set to be half a unit of the position command for the driven unit.

5. The motor control device according to claim 2, wherein the position command generating unit is adapted to generate the position command for a preliminary movement of the driven unit, when at least one of the engaging difference in the first direction and the engaging difference in the second direction is not retained by the retaining unit.

* * * * *